United States Patent [19]
Eckstein et al.

[11] Patent Number: 4,731,197
[45] Date of Patent: Mar. 15, 1988

[54] POTASSIUM SUPEROXIDE PELLET

[75] Inventors: Wolfgang Eckstein, Sereetz; Carl-Ernst van der Smissen, Lübeck; Rainer Ernst, Curau; Bernhard Westrup, Lübeck, all of Fed. Rep. of Germany

[73] Assignee: Drägerwerk Aktiengesellschaft, Lübeck, Fed. Rep. of Germany

[21] Appl. No.: 27,722

[22] Filed: Mar. 19, 1987

[30] Foreign Application Priority Data

Mar. 20, 1986 [DE] Fed. Rep. of Germany ....... 3609378
Nov. 15, 1986 [DE] Fed. Rep. of Germany ....... 3639146

[51] Int. Cl.$^4$ .................. A62D 9/00; C01B 15/043
[52] U.S. Cl. .................. 252/186.32; 252/186.27; 252/186.38; 252/186.43; 423/581
[58] Field of Search ........... 252/186.2, 186.25, 186.27, 252/186.32, 186.43, 186.38; 423/581

[56] References Cited

U.S. PATENT DOCUMENTS 3,767,367 10/1973 Rio ........................ 422/122
4,113,646 9/1978 Gustafson ............. 252/186.21 X
4,490,272 12/1984 Malafosse et al. ........... 252/186.43
4,490,274 12/1984 Maslyaev et al. ............ 252/186.22

FOREIGN PATENT DOCUMENTS 320810 3/1919 Fed. Rep. of Germany.
331721 3/1934 Fed. Rep. of Germany.

Primary Examiner—John F. Terapane
Assistant Examiner—Virginia B. Caress
Attorney, Agent, or Firm—Walter Ottesen

[57] ABSTRACT

A pellet of potassium superoxide, as the oxygen-yielding chemical, with an additive of catalyst material for stimulating the release of oxygen is improved by providing a concentrated addition of the catalyst material on the surface of the pellet; this permits a uniform release of oxygen during the entire period of the use of the pellet. With the pellet, oxygen is split off as required at the very outset of breathing with the breathing apparatus and a release of oxygen in excess of demand as use continues is avoided. A pellet of this type includes a compressed core body containing substantially potassium superoxide and surrounded by a compressed jacket made of highly catalyzed potassium superoxide material.

6 Claims, 1 Drawing Figure

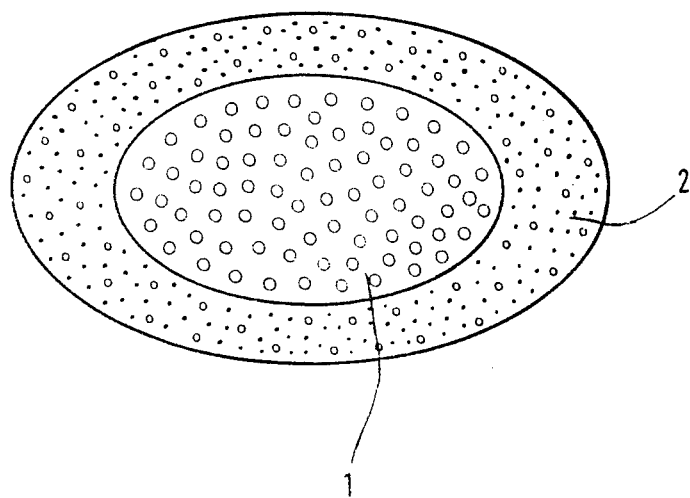

POTASSIUM SUPEROXIDE PELLET

FIELD OF THE INVENTION

The invention relates to a pellet of potassium superoxide ($KO_2$), as a chemical that gives off oxygen. An added catalyst material promotes the release of oxygen.

BACKGROUND OF THE INVENTION

A pellet of this type is known from examined German patent application DE-AS No. 21 59 493.

In breathing apparatus, pellets such as pressed tablets of $KO_2$ are used as a charging material for cartridges that furnish oxygen. It has been shown to be disadvantageous that sufficient oxygen production begins only several minutes after breathing with the equipment starts. For this reason, decomposition catalysts are added to these pellets of $KO_2$. This causes oxygen production to begin immediately after breathing with the equipment starts, thus bridging the period of inadequate oxygen production at the beginning of breathing with the equipment. However, the catalysts also continue to promote the splitting off of oxygen even after the cartridge has warmed up and oxygen production has already become more than sufficient. In that case more oxygen is furnished by the cartridge than is breathed by the person wearing the equipment. The excess oxygen is vented to the outside via an overpressure valve and so is lost for breathing purposes.

The known pellets having a catalyst are therefore provided merely as a thin partial layer disposed ahead of the charge of an oxygen-furnishing cartridge. In this case, it is a requirement that each cartridge has to contain a fixed amount of two different charges. Having a suitable supply of different kinds of pellets on hand is therefore mandatory.

German Pat. No. 320 810 discloses that a catalyst, for example manganese dioxide, can be dusted in powder form onto a pellet having an alkaline peroxide as the oxygen-yielding chemical after first sufficiently moistening the surface of the pellet by spraying water thereon. However, the application of dry catalyst powder onto the moistened surface of the pellet causes an uneven distribution of the catalyst on this surface. Moreover, the contact of the catalyst with the oxygen-yielding chemical is not complete enough to promote the emission of oxygen in a uniform and intended manner.

It is also known to spray the solution of a catalyst onto a chemical that yields oxygen. In this connection, reference may be made to German Pat. No. 331 721.

Spraying an aqueous solution of manganese sulfate onto sodium peroxide, for example, causes a partial decomposition of sodium peroxide by means of water, producing sodium hydroxide and hydrogen peroxide. The hydrogen peroxide that is formed still sticks to the resulting mixture of sodium peroxide and sodium hydroxide. These additive compounds are then capable of reacting with the applied catalyst.

On the other hand, spraying aqueous solutions of the catalyst onto $KO_2$ pellets does not improve the reaction performance.

SUMMARY OF THE INVENTION

In view of the above, it is an object of the invention to provide a pellet of this type such that a concentrated addition of the catalyst material on the surface of the pellet can occur to enable a uniform release of oxygen during the entire period of use. Thus, the splitting off of oxygen in appropriate response to demand is assured from the beginning of breathing with the breathing equipment, and excess emission of oxygen, beyond what is needed as use of the equipment continues, is avoided.

The pellet according to an embodiment of the invention has a pressed or densified core body made substantially of potassium superoxide which is surrounded by a pressed or densified jacket of intensely catalyzed potassium superoxide material.

The pellet according to another embodiment of the invention has a core body with a catalytic component of 0 to 0.05% and is surrounded by a compressed jacket having a catalytic component of 0.15 to 2%.

A pellet of this kind comprises two layers of different quantity compositions. The interior of the pellet comprises potassium superoxide, either containing no catalyst material or having catalyst material present in only very slight quantities. Surrounding the pellet is a jacket of the oxygen-yielding chemical, which has a high proportion of catalyst material added to it. When breathing with the equipment begins, catalyzed material is converted first, resulting in very early production of oxygen. After the conversion of the outer catalyzed layer, the core of the pellet, which is catalyzed not at all or only a little, comes into contact with the water vapor and $CO_2$ in the exhaled air of the person wearing the equipment. Because of the lack of sufficient quantities of catalyst, the core is converted substantially more slowly than the jacket of the pellet. This prevents an excess of oxygen so that the period of use of the equipment is prolonged substantially.

In the densified jacket of the core body, a uniform distribution of the catalyst material is attained, along with an intimate connection between this catalyst material and the oxygen-yielding chemical such as $KO_2$.

For producing jacketed pellets of this kind, conventional tablet-compressing machines can be used which can perform two different pressing operations in succession. First, uncatalyzed or only slightly catalyzed $KO_2$ material is prepressed to form a tablet core. Then the pressing form is moved apart again, and highly catalyzed $KO_2$ material is filled in around the core. In a second pressing operation, the catalyzed jacket is now wrapped around the non-catalyzed core.

Copper oxychloride has proved to be a suitable catalyst material to obtain a pronounced catalytic effect.

BRIEF DESCRIPTION OF THE DRAWING

The invention will now be described with reference to the drawing which shows a pellet, in section, according to an embodiment of the invention.

DESCRIPTION OF THE PREFERRED EMBODIMENT OF THE INVENTION

The drawing shows a pellet made of potassium superoxide with an outer shape which is lenticular. The pellet comprises a compressed core body 1 of potassium superoxide (represented by blank circles) which is surrounded by a jacket 2.

In addition to the potassium superoxide the jacket 2 contains the catalyst material (represented by dots) in the quantity required for optimal efficiency. The diameter of the pellet thus formed is generally a few millimeters, thus furnishing a suitable granule size for charging a corresponding cartridge in a breathing apparatus.

It is understood that the foregoing description is that of the preferred embodiments of the invention and that various changes and modifications may be made thereto without departing from the spirit and scope of the invention as defined in the appended claims.

What is claimed is:

1. A pellet comprising:
   a body made of potassium superoxide for releasing oxygen and an additive catalyst material for stimulating the release of the oxygen; and,
   said body including a pressed core with said catalyst material being a constituent of 0 to 0.05% of said core; and, a pressed jacket surrounding said core with said catalyst material being a constituent of 0.15 to 2.0% of said jacket.

2. The pellet of claim 1, said catalyst being copper oxychloride.

3. The pellet of claim 1, said jacket containing a component of catalyst material of 1 to 2%.

4. The pellet of claim 3, said component of catalyst material being copper oxychloride.

5. A pellet comprising:
   a pressed core made of potassium superoxide without a catalyst contained therein; and,
   a pressed jacket made of potassium superoxide surrounding said core and containing a catalyst therein.

6. The pellet of claim 5, said catalyst being copper oxychloride.

* * * * *